Nov. 25, 1941. E. W. BORGE 2,263,858
SCREW FEEDING DEVICE
Filed July 26, 1937
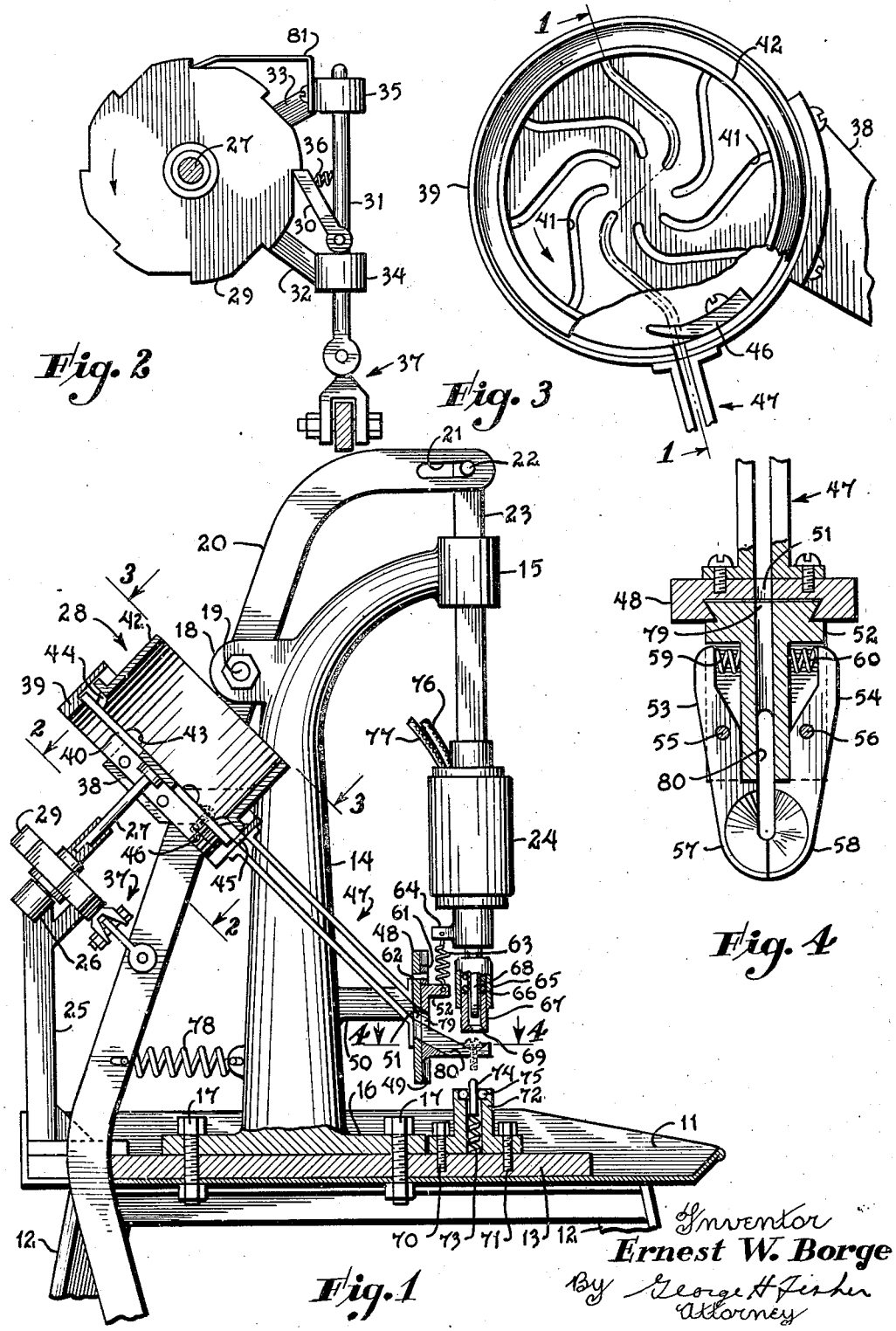
Inventor
Ernest W. Borge
By George H. Fisher
Attorney Patented Nov. 25, 1941

2,263,858

UNITED STATES PATENT OFFICE 2,263,858

SCREW FEEDING DEVICE

Ernest W. Borge, Minneapolis, Minn., assignor to Minneapolis-Honeywell Regulator Company, Minneapolis, Minn., a corporation of Delaware Application July 26, 1937, Serial No. 155,718

9 Claims. (Cl. 144—32)

The present invention relates to a hopper feed mechanism for feeding screws to an electric screw driver.

Heretofore considerable difficulty has been experienced in such feeding of screws, and particularly with the washer head type of screw. This screw is an ordinary round headed screw having a small thin washer just beneath the head and integral therewith. Such screws when fed, one right after another, into a chute or track, to be fed to the screw driver, have a tendency for one of these thin washers to slide up on top of the one next to it and thus cause a jam preventing the free passage of the screws through the chute or track. The operator of the machine must stop and manually free these screws from the jam, all of which slows up the procedure and lowers the efficiency of that particular machine.

It is therefore an object of the present invention to produce a device which will eliminate the possibility of jamming in the feeding of screws to an electric screw driver.

More specifically, it is an object of this invention to provide a mechanism for delivering screws to a chute or track one at a time as they are required.

A further object is to provide a hopper comprising a plate having slots therein for properly aligning the screws, in combination with a selector for pinching off one screw at a time for delivery to the track.

Another object is to provide an improved screw holding device for positioning the screw for actuation by the screw driver.

Still another object is to provide a pair of jaws resiliently held in abutting relationship for releasably holding the screw for actuation by the screw driver.

Certain modifications of this invention will become apparent to those skilled in the art, and it is therefore to be understood that the present embodiment of the invention has been disclosed for the purpose of illustration only and the limits of the invention must be defined by the scope of the appended claims.

The invention will be more readily understood upon examination of the specification in connection with the accompanying drawing, in which:

Fig. 1 is a side view partly in elevation and partly in section of one embodiment of the invention, the section through the hopper being taken on the line 1—1 of Fig. 3;

Fig. 2 is a detail view of the ratchet mechanism for rotating the hopper, taken on the line 2—2 of Fig. 1;

Fig. 3 is a plan view of the hopper with part broken away looking in the direction of arrows 3—3 of Fig. 1, and Fig. 4 is a detail view of a section of the resilient jaw means for supporting the screw taken on line 4—4 of Fig. 1.

Like reference characters designate like parts throughout the several views of the drawing.

The device about to be described is mounted on a table 11 having legs 12 by means of a plate 13 which carries a standard 14 bent over at its top and made at the extremity thereof in the form of a sleeve member 15 for a purpose to be later described. The lower end of standard 14 is formed with a flange 16 which has inserted therethrough bolts 17 which extend also through plate 13 and table 11 for securing the three of them tightly together. Standard 14 is provided with a pair of ears 18 which pivotally support by means of pin 19 extending therebetween, a lever 20 which has at its lower end below the table 11 a pedal (not shown) to be actuated by the operator of the present device. The upper end of this lever is bent over and has therein a slot 21 in which rides a pin 22 on a shaft 23, which shaft is slidably received by the sleeve 15 and carries at its lower extremity a screw driver 24 of conventional design. Also carried by plate 13 and at the rear thereof is a supporting member 25 which carries in any suitable manner a bearing 26 for shaft 27, to the upper end of which is rigidly connected a hopper generally indicated at 28.

Mounted near the lower end of shaft 27 and secured against rotation relative thereto is a ratchet wheel 29 which cooperates with a pawl 30 carried by rod 31. Support 25 has extending from the upper end thereof a pair of arms 32 and 33 carrying sleeves 34 and 35 for slidably supporting rod 31. Mounted between the rod 31 and pawl 30 is a compression spring 36 for maintaining the pawl 30 against the ratchet wheel 29. Rod 31 is connected to lever 20 for operation thereby by means of a universal connection generally indicated at 37. Spring finger 81 is attached to sleeve 35 and presses against ratchet 29 to prevent its reverse movement as pawl 30 is withdrawn after rotating the ratchet wheel. Arm 38 which is rigidly attached to standard 14 carries a retaining means 39 which acts as a support and bearing member for the rotatable hopper 28. Hopper 28 comprises a base 40 in the form of a plate having a series of reversely curved slots 41 therein. Secured to base 40 at the circumference thereof is a rim 42 which has a series of holes 43 in the place where it is joined to plate 40, which holes register with the ends of slots 41. These slots 41 are of such a size that they will slidingly receive the stem of the screws placed in the hopper but will not permit the heads thereof to pass through. The holes 43 in the rim are of such a size as to permit the head of the screw to pass through so that if the screws which were aligned in any particular slot were not otherwise prevented, they would pass through the rim 42 and out of the hopper.

Retaining means 39 has a rim portion 44 which normally prevents the screws from thus passing from the hopper, but this retaining means is provided with a single hole 45 which is large enough to permit a screw to pass therethrough. Now when the hopper is rotated so that the end of a slot and hole in the hopper register with the hole 45 in the retaining means 39, screws will be permitted to pass therethrough but the retaining means 39 will prevent the passage of screws from the remaining slots. Secured to retaining means 39 just beneath the hopper is a cam or selector 46 so shaped that as the hopper is rotated it will extend between the first and second screws aligned in the slot which registers with the hole in the retaining means, with the result that only one screw may drop from the hopper. Secured to the retaining means 39 around the hole 45 therein is a track generally indicated at 47 which comprises four wires or rods arranged to slidingly receive the screw and guide it to a device for holding it for operation by the screw driver. This device comprises a member 48 having a track 49 therein and is rigidly supported from standard 14 by means of an arm 50. Member 48 has a hole 51 therein around which is connected the lower extremity of track 47 and which hole is of such size as to permit the passage of a screw therethrough.

Riding in track 49 is a carrier 52 which pivotally supports a pair of jaws 53 and 54 by means of pins 55 and 56. The extremities 57 and 58 of these jaws are hollowed out to form a cup for retaining the head of the screw, which extremities are held in abutting relationship by means of compression springs 59 and 60. Carrier 52 has therein a hole 79 of such a size as to permit the passage of a screw therethrough which cooperates with a track 80 formed therein to guide the screw to the cup shaped ends of the jaws 53 and 54. When carrier 52 is in its upper position, it lies against an abutment 61 held by pin 62 in track 49 of member 48. Carrier 52 is supported in this position by means of a coil tension spring 63 carried by lug 64 on the screw driver 24. As the screw driver is lowered to drive the screw, carrier 52 will also be lowered which will bring hole 79 out of registry with hole 51 thereby preventing another screw from dropping down into the cup shaped ends of the jaws. At the lower end of the screw driver is a retaining cup 65 housing a spring 66 which normally forces a finder 67 to its lowermost position. In this position, finder 67 completely surrounds blade 68 of the screw driver and has a hole 69 therein for locating over the head of the screw to properly align the screw and blade of the screw driver. As the screw driver continues to descend, this finder 67 will be forced upwardly relatively to the screw driver, compressing spring 66 and exposing the blade of the screw driver which engages the screw forcing it downwardly and spreading jaws 53 and 54 and at the same time rotating the screw for entrance into the work.

Mounted on plate 13 directly beneath the screw driver by means of screws 70 and 71 is a perforated housing 72 surrounding a coiled compression spring 73 and pin 74 which normally extends slightly above the upper surface of housing 72. The hole in the work in which it is desired to drive the screw is located by the operator around pin 74 at which time it is directly aligned with the screw and screw driver. Now as the operator lowers the screw driver, the screw will be forced into this hole and as it passes through the work the bottom of the screw will come into engagement with the ball bearings 75 which will burr it thereby preventing its coming loose. Conductors 76 and 77 connect the electric motor of the screw driver with a source of power (not disclosed) and with a switch, (also not disclosed), which is closed automatically as the screw driver is lowered for operation. Spring 78 is connected between lever 20 and standard 14 to rotate lever 20 in a counter-clockwise direction and raise the screw driver 24 away from the work when the operator releases the pedal on the lower extremity of said lever.

*Operation*

Assuming the parts to be in the position shown in Fig. 1, it will be noted that a screw is in the cup shaped jaws ready for actuation and that selector 46 is preventing the passage of any more screws from the hopper. The operator will now move lever 20 in a clockwise direction which will lower the screw driver to drive the screw into the work as explained above, and which will, through the ratchet and pawl mechanism, rotate the hopper an amount to bring the next curved slot in plate 40 in registry with hole 45 of the retaining means. Selector 46 will insert itself between the first and second screws in this slot allowing the first screw to slide out of the hopper and down the track 47. At this time, however, carrier 52 will have been lowered along its track 49 by the screw driver and holes 79 and 51 will not be in registry. Therefore, the screw which has just dropped from the hopper cannot pass down to the cup shaped jaws 53 and 54 but is held in hole 51 until the operator releases lever 20, at which time spring 78 will move the lever in a counter-clockwise direction raising the screw driver 24 and carrier 52 which will cause registry of holes 51 and 79. The screw will now drop down into the holding position and the machine is ready for another operation.

It is thus seen that applicant has provided a device where jamming of the screws is impossible due to the fact that only one screw at a time can pass through the track means. The device is also constructed so that the work and the screw to be driven are properly aligned with the screw driver before the blade can engage the kerf of the screw which results in a much better operation.

It will be apparent to those skilled in the art that many changes and modifications may be made in the above described embodiment of the invention without departing from the spirit thereof. In determining the limits of the present invention, reference must be had to the appended claims.

I claim as my invention:

1. In a device of the character described, a rotatable hopper comprising means having a plurality of slots for aligning a plurality of headed fasteners, said hopper means being disposed at an angle, retaining means having a single hole for registration with the end of said slots in succession as said hopper is rotated, said retaining means preventing fasteners from dropping out of the end of all of the slots except the one with which said hole is in registration, a selector for preventing all but the end fastener in said one slot from dropping out as said slot is brought into registration with said hole, a holding means, a track cooperating with said hole for guiding fasteners to said holding means as they drop through said hole, a driver, means for substantially simultaneously lowering said driver to drive a fastener into a piece of work and rotating said hopper until the next succeeding slot registers with said hole whereby another fastener is dropped on the track, and means for preventing a fastener from passing from the track to the holding means except when the driver is in its raised position.

2. In a device of the character described, a rotatable hopper comprising means having a plurality of curved slots for aligning a plurality of headed fasteners, said hopper means being disposed at an angle, retaining means having a single hole for registration with the end of said slots in succession as said hopper is rotated, said retaining means preventing fasteners from dropping out of the end of all of the slots except the one with which said hole is in registration, a stationary selector mounted on said retaining means, said selector being provided with a finger which projects between the first and second fasteners in the slot which is brought into registration with said hole whereby all but the end fastener are prevented from dropping out, a holding means, a track cooperating with said hole for guiding fasteners to said holding means as they drop through said hole, a driver, means for substantially simultaneously lowering said driver to drive a fastener into a piece of work and rotating said hopper until the next succeeding slot registers with said hole whereby another fastener is dropped on the track, and means for preventing a fastener from passing from the track to the holding means except when the driver is in its raised position.

3. In a device of the character described, a rotatable hopper comprising means having a plurality of slots for aligning a plurality of headed fasteners, said hopper means being disposed at an angle, retaining means having a single hole for registration with the end of said slots in succession as said hopper is rotated, said retaining means preventing fasteners from dropping out of the end of all of the slots except the one with which said hole is in registration, a selector for preventing all but the end fastener in said one slot from dropping out as said slot is brought into registration with said hole, a holding means, a track cooperating with said hole for guiding fasteners to said holding means as they drop through said hole, said holding means being slidable with respect to said track and having a cut-away portion for cooperation with said track to permit a fastener to descend by gravity from said track into said holding means, a driver, said holding means being supported by said driver, and means for substantially simultaneously lowering said driver to drive the fastener held by said holding means into a piece of work, lowering said holding means whereby its cut-away portion moves out of registration with said track thereby preventing another fastener from dropping into said holding means, and rotating said hopper until the next succeeding slot registers with said track whereby another fastener is dropped onto said track.

4. A feeding mechanism comprising in combination, a hopper having a base, said hopper being rotatably mounted at an angle, a plurality of curved slots in said base for receiving the stems of headed fasteners, retaining means having a single hole for registration with the end of said slots in succession as said hopper is rotated, said retaining means preventing the fasteners from dropping from the end of each of said slots except the one with which said hole is in registration, and stationary means having a finger which extends between the first and second fasteners in each slot as it is brought in registration with said hole whereby only the first fastener is permitted to drop from each slot as it is brought into registration with said hole by rotation of the hopper.

5. In a device of the character described, a holding device for headed fasteners, a track for delivering fasteners one at a time to said holding device, a cupped portion in said holding device, a cut-away portion in said holding device for registration with said track to guide a fastener as it gravitates from the track to said cupped portion, said holding device being slidable with respect to said track, a driver, means for supporting said holding device by said driver, said driver in its raised position supporting said holding device so that said cut-away portion registers with said track, and means for lowering said driver to drive the fastener held by said holding device into a piece of work and to simultaneously lower said holding device to prevent another fastener from dropping into it from said track, said last mentioned means also raising said driver and simultaneously lifting said holding device until its cut-away portion again registers with said track to permit another fastener to drop into said cupped portion.

6. In a device of the character described, a holding device for headed fasteners, a track for delivering fasteners one at a time to said holding device, a cupped portion in said holding device, a cut-away portion in said holding device for registration with said track to guide a fastener as it gravitates from the track to said cupped portion, said holding device being slidable with respect to said track, a driver, resilient means for supporting said holding device by said driver, said driver in its raised position supporting said holding device so that said cut-away portion registers with said track, and means for lowering said driver to drive the fastener held by said holding device into a piece of work and to simultaneously lower said holding device to prevent another fastener from dropping into it from said track, said last mentioned means also raising said driver and simultaneously lifting said holding device until its cut-away portion again registers with said track to permit another fastener to drop into said cupped portion, said driver operating through said resilient supporting means to slide said holding device whereby no excessive strain is placed on the parts in case a fastener should become jammed between the track and the holding device.

7. In a device of the character described, a rotatable hopper comprising a means having a plurality of slots for aligning a plurality of headed fasteners, said hopper means being disposed at an angle, retaining means having a single hole for registration with the end of said slots in succession as said hopper is rotated, said retaining means preventing fasteners from dropping out of the end of all of the slots except the one with which said hole is in registration, a selector for preventing all but the end fastener in said one slot from dropping out as said slot is brought into registration with said hole, a holding means, a track cooperating with said hole for guiding fasteners to said holding means as they drop through said hole, a driver, means for substantially simultaneously lowering said driver to drive a fastener into a piece of work and rotating said hopper until the next succeeding slot registers with said hole whereby another fastener is dropped on the track, and means for preventing a fastener from passing from the track to the holding means except when the driver is in its raised position, said slots being the only places where a plurality of fasteners may align themselves and cause a jam, continued operation of said driver causing further rotation of said hopper whereby said jam may be relieved by gravity.

8. In a device of the character described, a holding device for screw fasteners, a track for delivering fasteners one at a time to said holding device, a cupped portion in said holding device, a cut-away portion in said holding device for registration with said track to guide the fastener as it gravitates from the track to said cupped portion, a fixed mounting member at the lower end of said track, said holding device vertically slidably mounted in said mounting member, a rotary driver, resilient means connecting said driver and holding device whereby said driver in its upper position raises said holding device so that said cut-away portion registers with said track, and means for lowering said driver to drive the fastener held by said holding device into a piece of work and to simultaneously lower said holding device to prevent another fastener from dropping into it from said track, said last mentioned means also raising said driver and simultaneously lifting said holding device until its cut-away portion again registers with said track to permit another fastener to drop into said cupped portion, said driver operating through said resilient supporting means to slide said holding device whereby no excessive strain is placed on the parts in case a fastener should become jammed between the track and the holding device.

9. A feeding mechanism comprising in combination, a hopper including means rotatably mounted at an angle, said rotatable means having a plurality of non-radial slots for receiving the stems of headed fasteners, said slots being substantially longer than half the radius of said hopper, retaining means having a single opening for registration with the end of said slots in succession as said hopper is rotated, said retaining means preventing the fasteners from dropping from the end of each of said slots except the one with which said opening is in registration, and means preventing all but one fastener from dropping from each slot as it is brought into registration with said opening.

ERNEST W. BORGE.